(No Model.) 2 Sheets—Sheet 1.
U. H. W. SCHENCK.
BELT HOLDER AND SHIFTER.
No. 395,591. Patented Jan. 1, 1889.
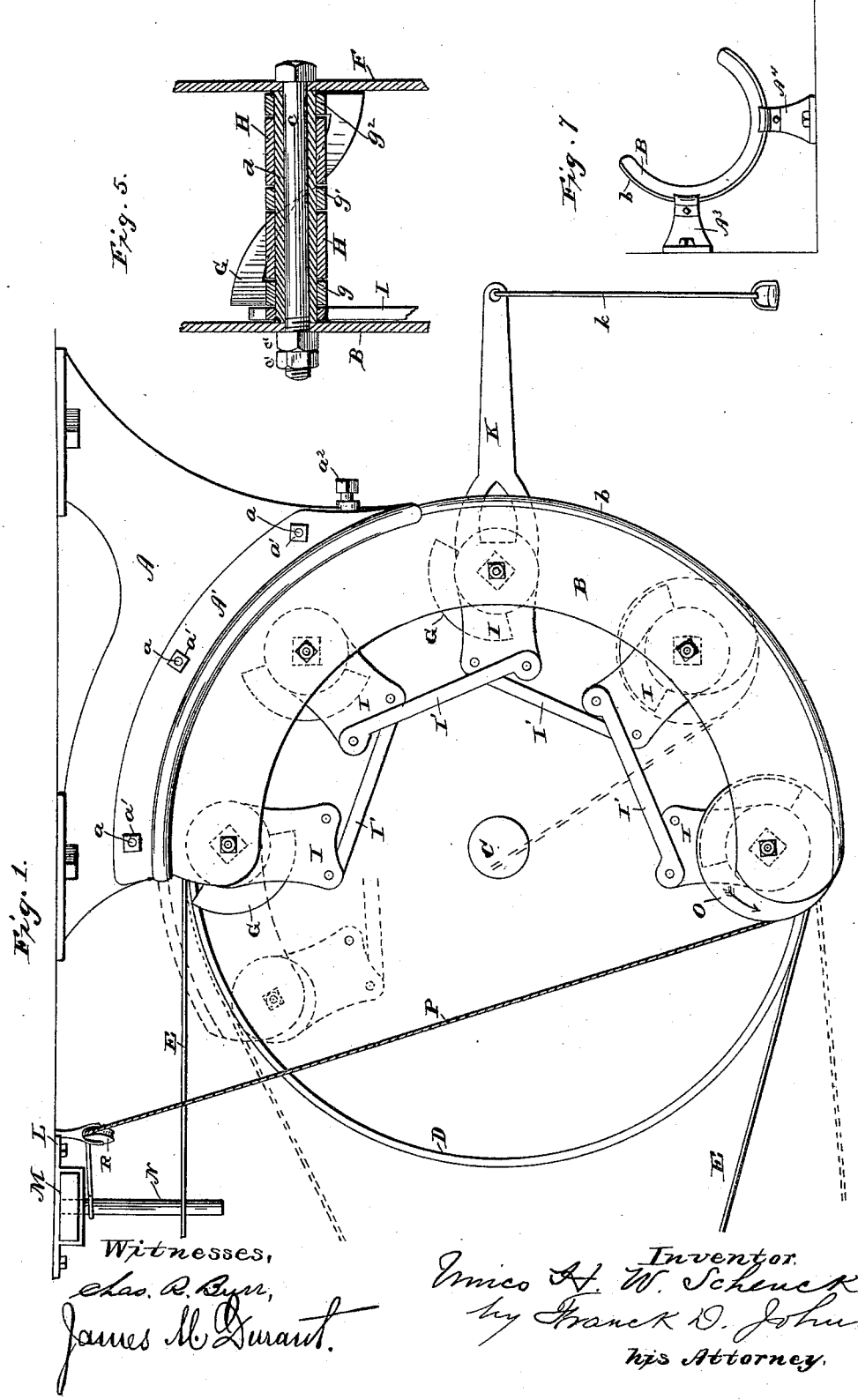
Witnesses,
Chas. R. Burr,
James M. Durant.
Inventor.
Urico H. W. Schenck
by Franck D. Johns
his Attorney.

(No Model.) 2 Sheets—Sheet 2.
U. H. W. SCHENCK.
BELT HOLDER AND SHIFTER.
No. 395,591. Patented Jan. 1, 1889.
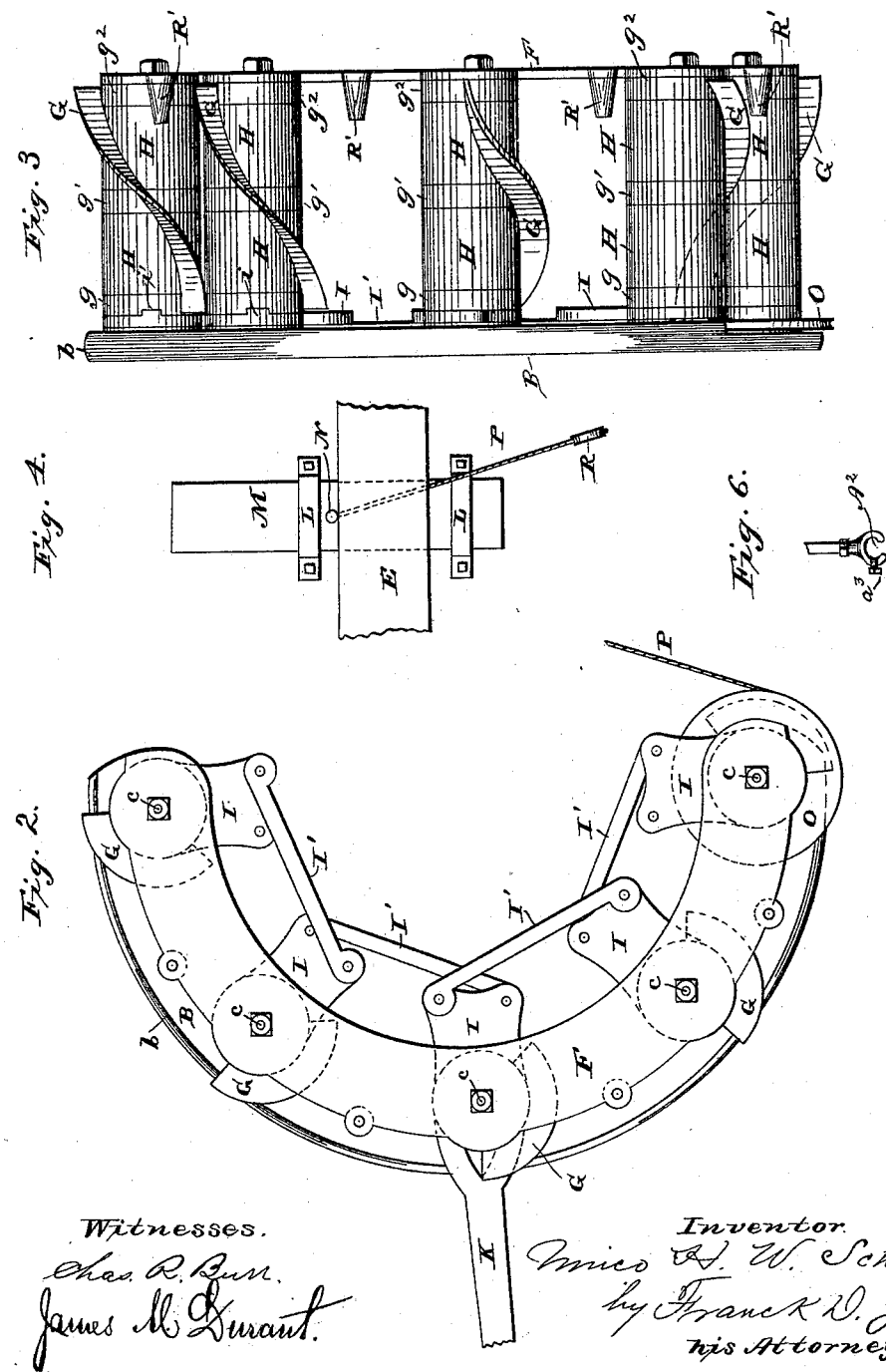
Witnesses.
Chas. R. Burr.
James M. Durant.
Inventor.
Urico H. W. Schenck
by Franck D. Johns
his Attorney.

UNITED STATES PATENT OFFICE.

UNICO H. W. SCHENCK, OF BROOKLYN, ASSIGNOR TO THE SCHENCK BELT HOLDER AND SHIFTER COMPANY OF NEW YORK, OF NEW YORK, N. Y.

BELT HOLDER AND SHIFTER.

SPECIFICATION forming part of Letters Patent No. 395,591, dated January 1, 1889.

Application filed March 29, 1888. Serial No. 268,849. (No model.)

*To all whom it may concern:*

Be it known that I, UNICO H. W. SCHENCK, a citizen of the United States, residing at Brooklyn, in the county of Kings and State of New York, have invented certain new and useful Improvements in Belt Holders and Shifters; and I do hereby declare the following to be a full, clear, and exact description of the invention, such as will enable others skilled in the art to which it appertains to make and use the same.

My invention relates to certain improvements in belt holders and shifters; and it consists in certain novelties in the construction and arrangement of the various parts, all of which I will now proceed to point out and describe, reference being had to the accompanying drawings, in which—

Figure 1 represents a side elevation of my improved belt holder and shifter; Fig. 2, an elevation showing the opposite side of the holder and shifter from that shown in Fig. 1; Fig. 3, a face view of the holder and devices for shifting the belt from said holder to the pulley; Fig. 4, a plan view of the device for shifting the belt from the pulley to the holder; Fig. 5, a detail in section of a part of my said invention; Fig. 6, a detail showing a modification of the bracket for supporting the holder, and Fig. 7 a detail showing a further modification.

Referring to said drawings, A represents a pendent bracket secured to the ceiling or other suitable support, the lower edge of the bracket being formed in a segmental line.

A' is a removable segmental plate secured to the lower edge of the bracket by bolts $a$ and nuts $a'$.

B is an adjustable sustaining-plate, formed in the shape of a sector. On said plate are arranged the belt supports and shifting devices, hereinafter described. The outer edge of the plate is formed with rounded T-shaped flange $b$. This flange rests between the lower edges of the bracket A and plate A', which conform to the shape of T-shaped flange of the plate. Said plate is secured to the bracket by tightening the nuts $a'$. A set-screw, $a^2$, may also be used to secure the sustaining-plate to the bracket. Instead of the removable segmental plate A' for securing the plate B to the bracket, a T-shaped groove, $A^2$, may be formed in the lower edge of said bracket, in which the T-shaped flange of the plate B enters and is secured by one or more set-screws, $a^3$, as shown in Fig. 6. As a further modification of the supporting device, two pendent arms, $A^3 A^4$, may be used with grooves in their lower ends, in which the plate B is secured, as shown in Fig. 7.

C is a shaft passing under the plate B; D, a pulley mounted thereon; and E is the belt.

F is a sector-shaped plate secured to the plate B by bolts $c$ and nuts $c'$. Said plate is located in close proximity to the pulley D and is concentric with the plate B, but the arc of its outer edge is of less radius than the arc of the outer edge of said plate B. Said bolts $c$ are arranged in a segmental line concentric with the associated pulley. Surrounding each bolt $c$ and interposed between the plates B and F are sleeves $d$. When the nuts $c'$ on the bolts $c$ are tightened, the plates B and F are drawn against the ends of the sleeves $d$, so as to secure said plates firmly together.

G are a series of vibratory spiral shifters, preferably formed in the shape of spiral webs, which extend partially around said sleeves, and are secured to bearings $g$ $g'$ $g^2$, which are mounted on the sleeves $d$, one shifter being mounted on each sleeve, the axes of said shifters being transverse to the line of movement of the belt.

H are a series of roller-bearings mounted on the sleeves between the bearings $g, g'$, and $g^2$ of the shifters. Said bearings H have their surfaces flush with the surfaces of the bearings $g$ $g'$ $g^2$ and form supports which constitute the belt holder or carrier. I preferably use the roller-bearings, as described; but said supports may be rigidly secured to the sleeves, if desired.

I are levers mounted on the sleeves $d$, and are secured to the shifters by keys $i$, engaging with key-seats $i'$ in the ends of said shifters. The lower ends of the levers are connected by links I'. To one of said levers I is secured an operating-lever, K.

$k$ is a rod secured to the end of the lever K and hanging within reach of the operator. By means of this rod the operating-lever can be moved up or down, as desired. The links I' are so arranged that the movement of the shifters will be uniform when operated by the lever K. The bolts $c$ being arranged in a segmental line concentric with the pulley, it is apparent that the sleeves $d$ and belt bearings or supports H, mounted thereon, will also be arranged in a segmental line and concentric with the pulley. When the belt is not in operation, it rests upon and is held by said supports or bearings H, having been shifted thereon, as hereinafter described. The spiral shifters G are then within the segmental line in which the supports are arranged and do not touch the belt. Said spiral shifters are so arranged that when operated by the lever K and intermediate mechanism they will be moved beyond the segmental line of the bearings or supports, the ends of the shifters approximate to the plate B and away from the pulley first moving out of said segmental line. These ends of the shifters will first engage with belt on its side away from the pulley, lift the same and tilt it toward the pulley, causing it to slide off the bearings. As the shifters are gradually turned, they continue to lift the outer side of the belt and incline it toward the pulley, gradually shifting the same. When the ends of the shifters approximate to the pulley have moved out of the segmental line of the supports, the belt slips off the same onto said pulley.

It will thus be seen that the shifters present lifting-surfaces inclined toward the pulley, which engage with the under side of the belt first at its side away from the pulley and tilt the same toward said pulley, gradually shifting said belt onto the pulley. So far as described this constitutes the belt-holder and the devices for shifting it onto the pulley.

A further feature of my invention is the device for shifting the belt onto the holder, which I will now describe.

Secured to the ceiling or other suitable support at points over the belt are brackets or bearings L. Mounted in said brackets is a sliding shifting-bar, M, having a pendent shifting-arm, N, engaging with the belt on its side away from the holder. Instead of two bearings, one may be used having a longitudinal slot through which the arm N projects.

If desired, the sliding bar may be mounted below the belt and have the arm N project up to engage with the belt.

Mounted on the lowest of the series of sleeves $d$ is a sheave, O, keyed to the lever on said sleeve, so as to turn with the spiral shifter on the same when said shifter is operated by the intermediate mechanism described.

P is a rope or chain secured at one end to the sheave and having its other end secured to the arm N or sliding bar M. Said rope or chain passes over a pulley, R, located in front of the bearings and about over the sheave, thus preventing the rope from coming in contact with the belt or pulley. When the lever is moved up to throw the shifters below the line of supports, the sheave turns in the direction of the arrow and winds the rope or chain partially around it, thus drawing the bar M toward the carrier or holder, and the arm N, coming in contact with the belt, shifts it from the pulley to the holder. When the lever is drawn down to effect the shifting of the belt from the holder to the pulley, as heretofore described, the sheave turns in the opposite direction to the arrow and unwinds the rope or chain. The belt as it is shifted coming in contact with the arm N forces it back.

If desired, the sheave O may be mounted on any of the other supports or sleeves $d$ instead of the lowest.

Secured to the outer edge of the plate F, located between the supports and projecting in toward the opposite plate, B, are conical roller-bearings R'. These bearings facilitate the shifting of the belt and prevent it from catching on the edge of the plate F. I preferably use roller-bearings, as described; but said bearings may be rigidly secured to said plate F.

The supports or bearings forming the holder are so arranged that the first or upper support is placed in a line with the belt-receiving point of the pulley, the last or lowest support in a line with the point where the belt leaves the pulley. When the direction of the belt is changed so as to change the belt-receiving point and point at which said belt leaves the pulley, as indicated in dotted lines, Fig. 1, it is desirable to change the position of the holder so that the first and last supports will be in line with these points. This I accomplish by means of the adjustable plate B, by simply loosening the clamping bolts and nuts and moving the plate B to the desired point, as shown in dotted lines, Fig. 1.

It is apparent that various changes may be made in the construction and arrangement of the various parts described without departing from the spirit and scope of my invention, and I do not limit myself to the specific construction herein set forth.

Having thus fully described my invention, I claim as new and desire to secure by Letters Patent—

1. In a belt holder and shifter, a sustaining-plate and a series of belt-supports arranged in a segmental line thereon, in combination with a series of vibratory spiral shifters mounted on axes transverse to the line of movement of the belt and adapted to engage with the under side of said belt, and suitable mechanism for operating said shifters, all constructed, arranged, and operating substantially as shown and described, whereby as said shifters are moved without the segmental line of the supports they will engage with the under side of the belt, lift the same, and shift it from said supports.

2. In a belt holder and shifter, a sustaining-plate and a series of belt-supports arranged in a segmental line thereon transverse to the line of movement of the belt, in combination with a series of vibratory spiral shifters mounted on said supports and mechanism, as described, for operating said shifters, all constructed, arranged, and operating substantially as set forth, whereby as the shifters are vibrated they will engage with the under side of the belt, lift the same, and shift it from the supports.

3. In a belt holder and shifter, the combination, with the sustaining-plates B and F, the series of bolts *c* and sleeves *d*, and bearings H, mounted thereon, of the vibratory spiral shifters G, mounted on the sleeves *d* and having the levers I and links I', connecting said levers, and the operating-lever K, all constructed, arranged, and operating substantially as shown and described.

4. In a belt holder and shifter, the combination, with a bracket secured to a suitable support, an adjustable sustaining-plate secured thereto, and a series of belt-supports arranged in a segmental line on said plate, of a series of vibratory spiral shifters mounted on axes secured to the sustaining-plate and transverse to the line of movement of the belt and adapted to engage with the under side of said belt, and suitable mechanism for operating said shifters, all constructed, arranged, and operating substantially as shown and described.

5. In a belt-holder, the combination, with a bracket secured to a suitable support and an associated pulley, of a sustaining-plate secured to said bracket and adjustable in the arc of a circle concentric with the associated pulley, and having a series of belt-supports arranged in a segmental line thereon, all constructed and arranged substantially as shown and described, as and for the purpose set forth.

6. In a belt holder and shifter, a suitable belt-holder frame arranged in close proximity to an associated pulley and belt, and a sheave mounted on said frame and connected with a suitable operating-lever, in combination with a sliding bar mounted in bearings and having a shifter-arm adapted to engage with the belt on its side away from the belt-holder, and a rope or chain secured at one end to the sheave and at the other to the sliding bar, all constructed, arranged, and operating substantially as shown and described, whereby when the sheave is turned the rope or chain will be wound around the same and draw the pending arm toward the holder and cause it to engage with and shift the belt onto said holder.

7. In a belt holder and shifter, the combination, with the sustaining-plate B, having a series of belt-supports arranged in a segmental line thereon in proximity to an associated pulley and belt, of the sheave O, mounted on one of said supports and connected with a suitable operating-lever, the sliding bar M, mounted in bearings and having the shifting-bar N, engaging with the belt on its side away from the supports, and the rope or chain P, connecting the sliding bar and sheave, all constructed, arranged, and operating substantially as shown and described.

In testimony whereof I affix my signature in presence of two witnesses.

UNICO H. W. SCHENCK.

Witnesses:
JOHN A. BURKE,
WILLIAM MOLLOY.